United States Patent [19]
Ecke et al.

[11] Patent Number: 6,137,565
[45] Date of Patent: Oct. 24, 2000

[54] BRAGG GRATING TEMPERATURE/STRAIN FIBER SENSOR HAVING COMBINATION INTERFEROMETER/SPECTROMETER OUTPUT ARRANGEMENT

[75] Inventors: Wolfgang Ecke; Steffen Goerlich; Siegfried Belke, all of Jena, Germany

[73] Assignee: Jenoptik Aktiengesellschaft, Jena, Germany

[21] Appl. No.: 09/306,533

[22] Filed: May 6, 1999

[30] Foreign Application Priority Data

May 15, 1998 [DE] Germany .......................... 198 21 616

[51] Int. Cl.$^7$ ........................................ G01B 9/02
[52] U.S. Cl. .................. 356/35.5; 356/345; 356/346
[58] Field of Search ........................ 356/32, 35.5, 345, 356/346; 250/227.19, 227.27; 385/12, 14

[56] References Cited

U.S. PATENT DOCUMENTS

| | | | |
|---|---|---|---|
| 5,361,130 | 11/1994 | Kersey et al. | 345/345 |
| 5,513,913 | 5/1996 | Ball et al. | 356/32 |
| 5,680,489 | 10/1997 | Kersey | 356/35.5 |

*Primary Examiner*—Samuel A. Turner
*Attorney, Agent, or Firm*—Reed Smith Shaw & McClay

[57] ABSTRACT

An arrangement for simultaneous optical determination of temperature and strain fluctuations in an optical fiber for precisely determining the changes in environmental influences and/or fiber loads is disclosed. The arrangement performs two different measurement tasks of the absolute measurement of a stationary quantity, such as temperature and the relative, high-resolution measurement of quickly varying quantities of fluctuation processes with comparable accuracy in a single optical The arrangement which is achieved using a spectrometer with an imaging, spectrally dispersive element, a first input light bundle being arranged with reference to the dispersive element such that the light spectrally dispersed at the dispersive element is projected onto a first linear receiver The arrangement, and an additional second input light bundle is directed onto the dispersive element in the spectrometer, whose spectrally dispersed light falls onto a second linear receiver The arrangement, parallel to the first one, the two input light bundles are fed light from a broadband light source which has been reflected by at least two optical fiber gratings with different mean wavelengths, and an interferometer The arrangement with phase modulation and different arm lengths is present at least in the light path of the second input light bundle upstream of the spectral dispersion by means of the dispersive element, whose evaluation is performed via the second receiver. The arrangement by means of phase modulation modules with reference to relative changes in the Bragg wavelengths, while a CCD evaluation module for determining the absolute Bragg wavelengths of the optical fiber gratings is arranged downstream of the first receiver The arrangement.

24 Claims, 4 Drawing Sheets

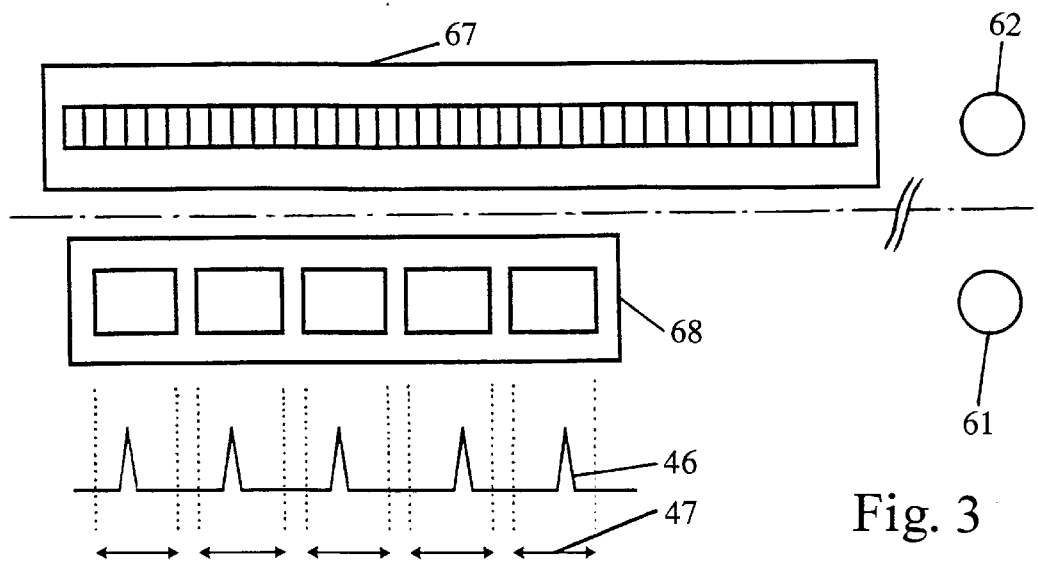
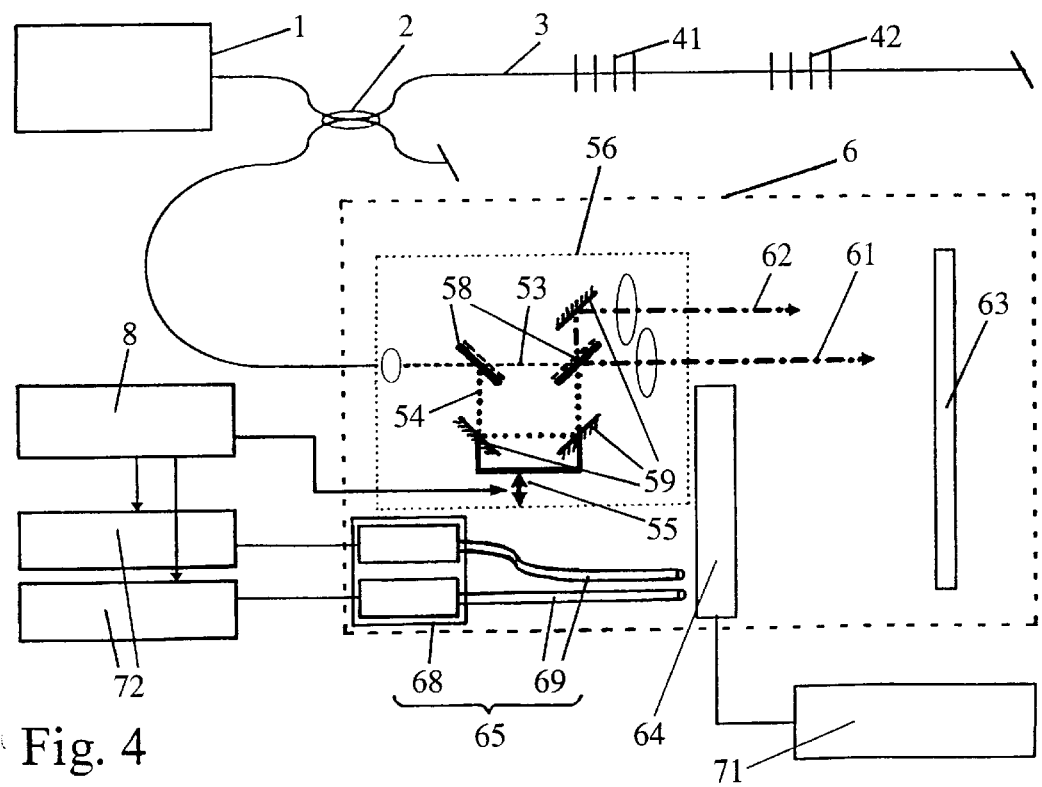
Fig. 3
Fig. 4

BRAGG GRATING TEMPERATURE/STRAIN FIBER SENSOR HAVING COMBINATION INTERFEROMETER/SPECTROMETER OUTPUT ARRANGEMENT

BACKGROUND OF THE INVENTION a) Field of the Invention

The invention relates to an arrangement for the simultaneous optical determination of absolute physical state variables and relative changes in physical quantities in an optical fiber, in particular, for determining the temperature and strain fluctuations in an optical fiber for the purpose of precisely determining the changes in environmental influences and/or fiber loads. The invention is preferably applied in processes in which there is a desire or need for current detection of random fluctuations in temperature and pressure, or of fiber stresses.

b) Description of the Relevant Art

It has long been known to use optical fibers and fiber gratings to measure temperature or strain (Fiber optic and laser sensors VII, Proc. of SPIE, Vol. 1169 (1989), pages 98–107), use being made of suitable optical spectral analyzers (edge filters, grating spectrometers, Fabry-Perot etalons), which make absolute measurements, to determine the Bragg wavelength and the value, resulting therefrom by calculation or calibration, of the state variable. Customary limits for the resolution and accuracy of these methods are approximately 1 to 10 pm for the Bragg wavelength and thereby approximately 0.1 to 1 K for the temperature and 0.5 to 5 $\mu\epsilon$ for the relative strain. A plurality of optical fiber gratings along an optical fiber can be evaluated simultaneously by designing them with their Bragg wavelengths differing greatly (by a few nm), with the result that these reflections can be measured spectrally independently of one another. These methods have become known through A. D. KERSEY et al. ("Multiplexed fiber Bragg grating strain-sensor system with a fiber Fabry-Perot wavelength filter", in: Optics Letters 18 (1993) 16, pages 1370–1372) as wavelength division multiplexing of the individual sensors and subsequent demultiplexing of the measurement signals.

Furthermore, it is known from Electronic Letters 28 (1992) 3, pages 236–238 (A. D. KERSEY et al.: "High resolution fiber grating based strain sensor with interferometric wavelength-shift detection") to determine strain fluctuations by precise wavelength resolution where the light is fed into an interferometer with asymmetric arm lengths, and it is possible to deduce the temporal characteristic of the change in the state variable from the temporal characteristic of the resulting optical phase difference at the interferometer output. Customary resolution limits are then 1 to 10 n$\epsilon$ for the amplitude of a strain fluctuation in the frequency band above 10 Hz.

According to a publication by T. A. BERKOFF et al. (in: IEEE Photonics Technology Letters 8 (1996) 11, pages 1522–1525, "Fiber Bragg grating array sensor system using a bandpass wavelength division multiplexer and interferometric detection") for the purpose of simultaneously evaluating a plurality of optical fiber gratings wavelength filters were connected downstream of the interferometer in order to determine the optical phase of the various wavelength components of the various optical fiber gratings separately.

OBJECT AND SUMMARY OF THE INVENTION

It is the primary object of the invention to accomplish the two different measurement tasks of the absolute measurement of a stationary quantity, such as the Bragg wavelength or the temperature, and the relative high-resolution measurement of quickly varying quantities of fluctuation processes with comparable accuracy in a single optical arrangement.

According to the invention, the object is achieved in the case of an arrangement for optically determining an absolute physical state variable in an optical fiber with the aid of an optical spectral analyzer for determining different Bragg wavelengths of fiber gratings which have different mean wavelengths and at which the light traversing the optical fiber is reflected, as well as means for calculating the absolute physical quantity from the determined Bragg wavelengths, by virtue of the fact that the optical spectral analyzer is a spectrometer with an imaging, spectrally dispersive element, a first input light bundle being arranged with reference to the dispersive element such that the light spectrally dispersed at the dispersive element is projected onto a first linear receiver arrangement, that an additional second input light bundle is directed onto the dispersive element in the spectrometer, whose spectrally dispersed light falls onto a second linear receiver arrangement, parallel to the first one, that the two input light bundles are supplied from the light of a broadband light source which has been reflected by at least two optical fiber gratings with different mean wavelengths, that an interferometer arrangement with phase modulation and different arm lengths is present at least in the light path of the second input light bundle upstream of the spectral dispersion by means of the dispersive element, the evaluation section of the interferometer arrangement being arranged downstream of the second receiver arrangement assigned to this input light bundle, that a signal processing unit for determining the absolute Bragg wavelengths of the optical fiber gratings and for calculating a physical variable dependent thereon is connected downstream of the first receiver arrangement, and that a phase demodulation module arranged downstream of the second receiver arrangement is provided for evaluating interferometer signals for determining relative changes in the Bragg wavelengths of the optical fiber gratings, and for calculating the relative changes in a physical quantity.

In the case of a selected measurement task, it is preferable to determine the temperature as the absolute physical quantity and to determine the relative strain of the optical fiber as the relative physical quantity.

The optical fiber gratings are expediently arranged inside the optical fiber, which functions as a measuring point.

A prism is suitable as the imaging dispersive element. In a particularly advantageous variant, an imaging reflection grating is used as dispersive element. It is advantageous to use as interferometer arrangement a Mach-Zehnder interferometer which has two outputs, the first and the second input light bundles of the spectrometer being formed in each case by one of the outputs of the Mach-Zehnder interferometer.

It is equally possible to use a Michelson interferometer as interferometer arrangement. It is appropriate in this case, on the one hand, that the output of the Michelson interferometer is split via an additional branching element and is led onto both input light bundles of the spectrometer or, on the other hand, that the optical path advantageously is branched upstream of the splitting into interferometer arms, this first branch being fed to the first input light bundle of the spectrometer. In the latter case, the advantage results that the first input light bundle has no interferometric modulation whatsoever, and so restrictions relating to reading out the first receiver arrangement are abolished. The interferometer arrangement can also expediently be designed using free-beam optics with mirror elements, a mechanical displacing unit advantageously being provided as phase modulator for periodically changing the optical path length of an interferometer arm by means of a mirror displacement. The periodic mirror movement in this case is expediently carried out in a piezoelectric fashion.

It is particularly advantageous when the free-beam optical system is constructed as a Mach-Zehnder interferometer and is integrated in the spectrometer, and the outputs of the interferometer constitute the input light bundles of the spectrometer.

A further advantageous variant results when the interferometer arrangement is constructed from optical fibers and branching elements. In this case, the optical fibers are preferably monomode fibers.

The interferometer arrangement expediently contains an optical phase modulator, at least in one interferometer arm. It is preferred to use fiber-optic modulators driven in an electro-optical or piezoelectric fashion as phase modulators.

It proves to be favorable when the interferometer arrangement contains a phase modulator which can be driven by means of two-frequency sine-wave modulation, and the interferometer signals can be evaluated on a common multiple of the two frequencies.

In the case of the variant composed of optical fibers, it is advantageous to arrange phase modulators in both interferometer arms, the phase modulators being piezoelectric fiber stretchers for implementing a symmetric basic set-up of the interferometer arms and one phase modulator is driven in push-pull fashion relative to the other phase modulator.

It is advantageous to use a CCD row as first receiver arrangement of the arrangement according to the invention.

The second receiver arrangement is expediently a photodiode array. This yields the advantage that the second receiver arrangement can be adapted in number, position and width of the light entrance surfaces of its elements to the reflections of the different optical fiber gratings, account additionally being taken in this case of the expected fluctuation widths (preferably changes in temperature or strain), dependent on the measured quantity, of the wavelengths of the fiber grating reflections.

In order to adapt the number, position and width of the light entrance surfaces of the second receiver arrangement to the conditions of the fiber grating reflections, it is possible to produce photodiode rows in a suitable way or, in the case of the use of a regular row, to select only specific light-sensitive elements.

A more elegant possibility of adaptation to the conditions of the fiber grating reflections results when optical fibers are used for launching the fiber grating reflection onto the receiver row, fibers being adapted with different diameters and spacings to the number, position and magnitude of the fiber grating reflections, the light entrance surfaces of the fibers being arranged in the receiver plane prescribed by the imaging dispersive element, and their end surfaces being directed onto an arbitrarily positioned linear receiver array. In the latter case, the linear receiver array can also preferably be a row with regularly arranged elements.

The basic idea of the invention results from the consideration that a virtually stationary, absolute state variable and a relative quantity subject to rapid changes cannot be measured simultaneously with arbitrary accuracy. The present invention solves this problem by integrating two measuring methods known per se with only a slight outlay into a known measuring system. In this case, it is possible, in particular, to use a plurality of optical components simultaneously for the various measurement tasks without having to make compromises in the measuring accuracy.

It is possible by means of the arrangement according to the invention to use the known wavelength division demultiplexing both for the absolute measurement of stationary state variables, such as temperature, and for the measurement of rapidly varying relative quantities, such as characterize fluctuation processes and occur during strain processes in fibers, and carry out separately high-resolution measurements of these contrasting quantities.

The invention is to be explained in more detail below with the aid of exemplary embodiments.

BRIEF DESCRIPTION OF THE DRAWINGS

In the drawings:

FIG. 3 shows an enlarged drawing of a detail of the second receiver arrangement, in direction looking onto the light-sensitive elements of the receiver arrangements;

FIG. 4 shows an advantageous embodiment of the invention with a Mach-Zehnder interferometer using free-beam optics, and with a fiber-optic second receiver.

DESCRIPTION OF THE PREFERRED EMBODIMENTS

Figure 1:
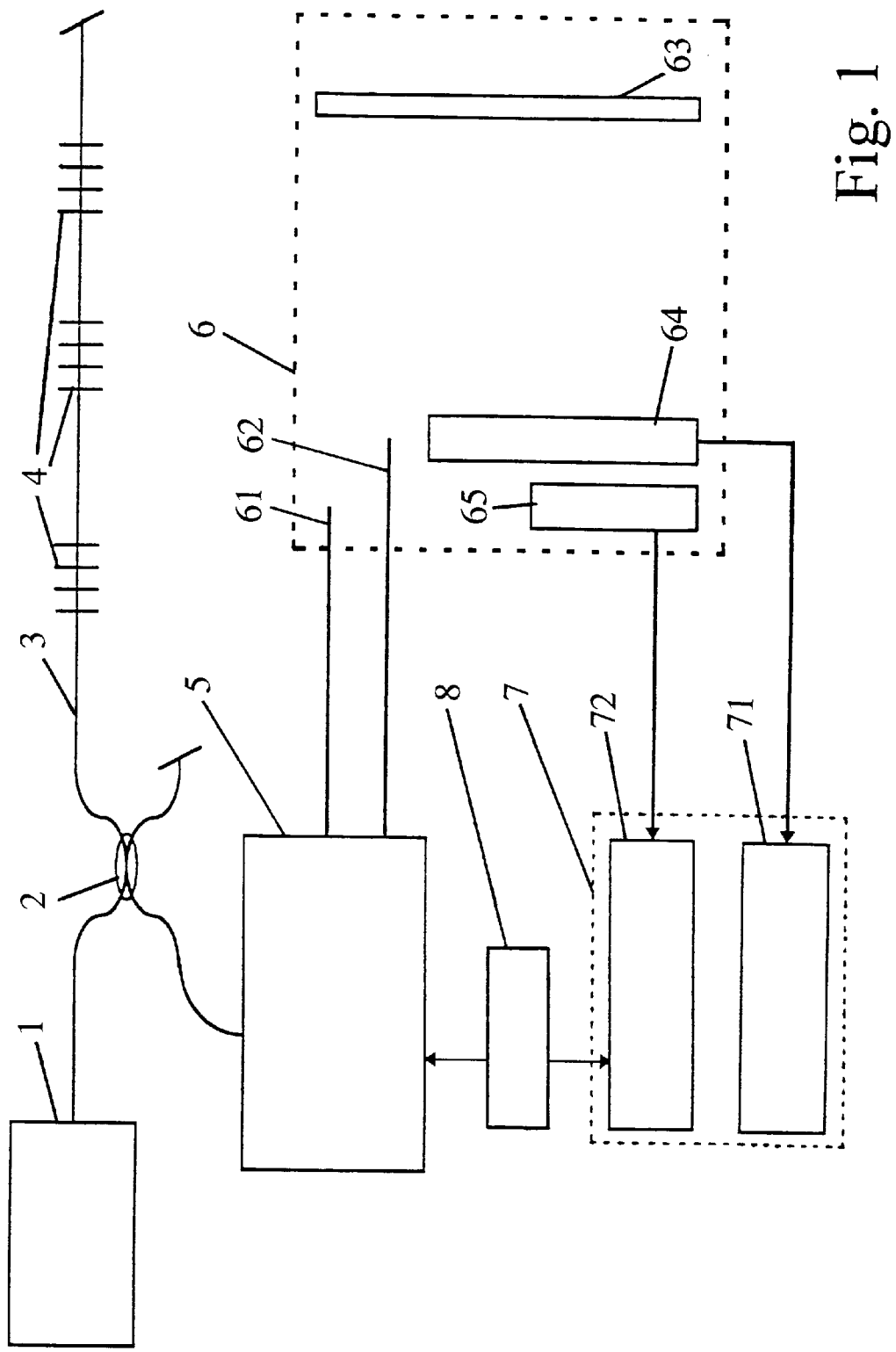
FIG. 1 shows the basic set-up of an arrangement according to the invention.

As represented in FIG. 1, the basic set-up of the arrangement according to the invention comprises a broadband light source 1, a fiber coupler 2 for launching the light of the light source 1 into an optical fiber 3 with fiber gratings 4 and for coupling out the light reflected at the fiber gratings 4, an interferometer arrangement 5, a spectral analyzer 6 which has two input light bundles 61 and 62, an imaging dispersive element 63 and two parallel receiver arrangements 64 and 65, as well as an evaluation unit 7, which contains two different evaluation modules, a conventional CCD evaluation module 71 for the normally operated spectral analyzer 6, and a phase modulation module 72 for an interferometric evaluation.

The broadband light source 1, which is preferably a superluminescent light emitting diode and in this case has, for example, an emission band from 820 to 855 nm, outputs its light into an optical fiber. This light is launched via the fiber coupler 2 into an optical fiber 3 which has as the actual sensor section at least two sensitized segments of a few millimeters in length and at a desired spacing, constituting the above-mentioned optical fiber gratings 4. The fiber gratings 4 are expediently inserted using conventional splicing technology into the inherently passive optical fibers, and are designed with different Bragg wavelengths. For example, neighboring fiber gratings 4 advantageously differ in each case by 6 nm in their Bragg wavelength. The wavelength region corresponds to the available bandwidth of the light source 1.

The light retroreflected by the fiber gratings 4 is coupled out of the fiber 3 again by the fiber coupler 2 and fed to an interferometer arrangement 5. In conjunction with an otherwise arbitrary mode of functioning—this interferometer arrangement 5 has an optical input, two optical splitters 51 and 52 for splitting the light from the fiber 3 into two light paths, producing two interferometer arms 53 and 54 with a different optical path length and superimposing the light from the two interferometer arms 53 and 54, and also at least one phase modulator 55 in one of the interferometer arms. The interferometer arrangement 5 supplies two optical outputs which, as incoming light bundles 61 and 62, are subjected in the spectral analyzer 6 to spectral dispersion in each case.

In the spectral analyzer 6, which is preferably a grating spectrometer with an imaging reflection grating 66 as dispersive element 63, the light of the two input light bundles 61 and 62 is dispersed on the basis of their spatial offset with reference to the dispersive element 63 into two separate, mutually parallel strip-shaped spectra which are projected onto a first and a second receiver arrangement 64 and 65, respectively. While the first receiver arrangement 64, which is a CCD row 67 customary in grating spectrometers, detects the wavelength distribution of the first input light bundle 61 and is therefore suitable for evaluating slow (f<10 Hz) and, in this case, relatively large changes (>1 pm) in the Bragg wavelengths of the optical fiber gratings 4, the second receiver arrangement 65, which is advantageously a linear photodiode array 68, picks up the rapid changes in the Bragg wavelength of the optical fiber gratings 4 by determining the optical phase shifts which can be detected as a consequence of the traversal of the different interferometer arms of the interferometer arrangement 5. The interferometric evaluation can fundamentally also be used to enhance the resolution of stationary measurements, but it then requires thermal stabilization of the interferometer 5.

The broadband light source will be consistently designated as light emitting diode 1 in the following examples without restricting generality.

Figure 2:
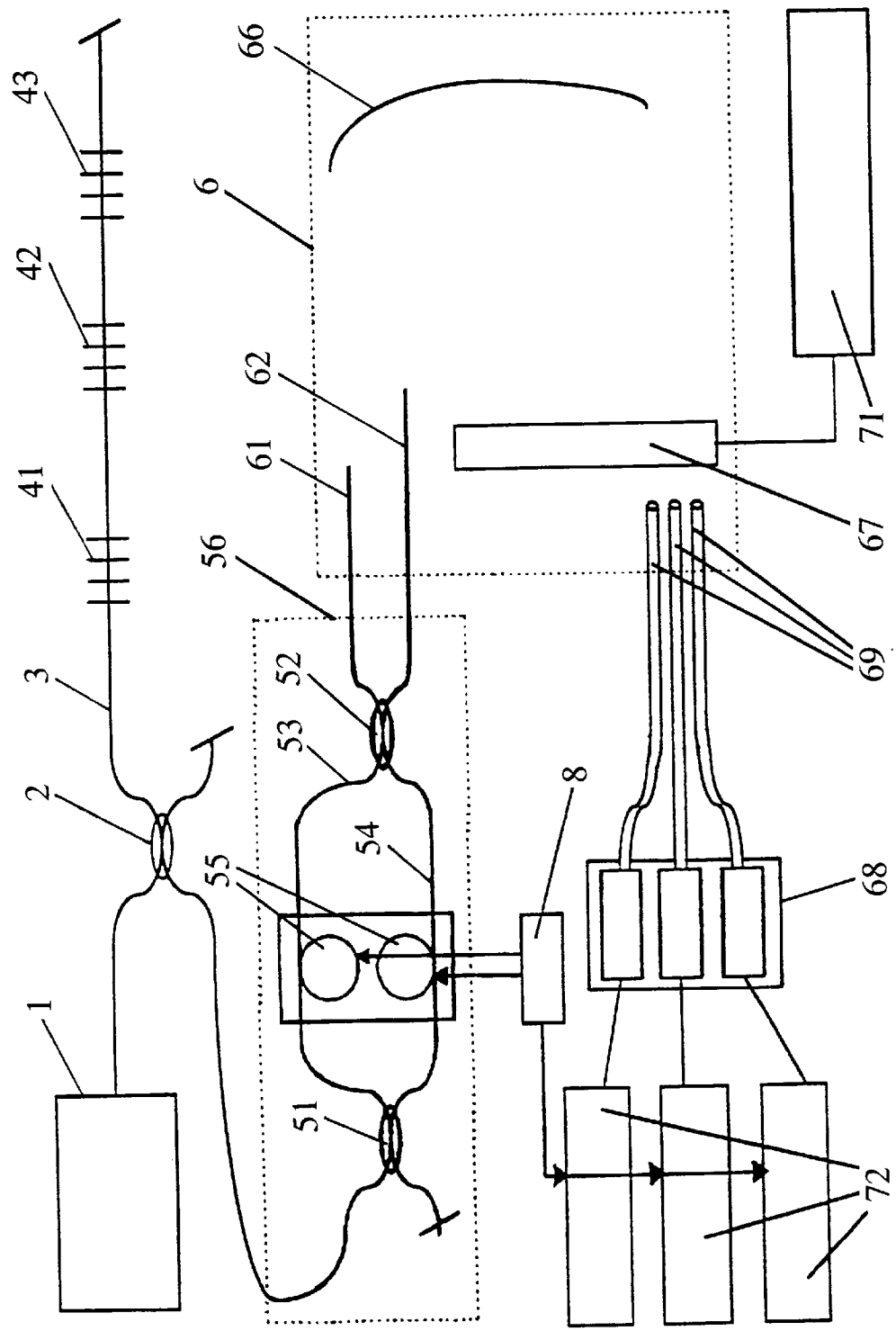
FIG. 2 shows a variant of the invention with an upstream Mach-Zehnder interferometer and a fiber-optic second receiver arrangement.

Represented in FIG. 2 is an advantageous embodiment of the arrangement according to the invention, which is distinguished by contrast with FIG. 1 by the selection of a specific interferometer arrangement 5 and an expedient second receiver arrangement 65.

Via the fiber coupler 2, which is preferably intended here to be a 1:1 coupler, the broadband light of the light emitting diode 1 is launched in the way described above into the optical fiber 3 which, in this example, contains three fiber gratings 41, 42 and 43. The reflections of these fiber gratings 41, 42 and 43 are likewise coupled out with the aid of the fiber coupler 2 in the ratio 1:1 and fed to the interferometer arrangement 5. The latter is in this case a fiber-optic Mach-Zehnder interferometer 56 which can be constructed in a known way from monomode optical fibers, and in the case of which there are located between two optical splitters 51 and 52 interferometer arms 53 and 54 which have different optical path lengths and of which at least one has a phase modulator 55. This phase modulator 55 which, for example at a frequency of 40 kHz generates an amplitude of 2.8 rad for the phase modulation is preferably a piezoelectric fiber stretcher. For the purpose of maintaining a symmetrical structure of the Mach-Zehnder interferometer 56, it is advantageous to include such a fiber stretcher in each interferometer arm 53 and 54, these two phase modulators 55 being operated in push-pull fashion. Because of the unequal optical lengths of the interferometer arms 53 and 54, a specific displacement of the Bragg wavelength $\delta\lambda_B$ in conjunction with an increasing difference in arm length $\Delta L$ yields an increasing displacement of the optical phase difference $\Delta\phi$ when the signals of the two interferometer arms 53 and 54 are superimposed by means of the fiber coupler 52:

$$\Delta\phi = 2\pi \cdot \delta\lambda_B n \cdot \Delta L / \lambda_B^2 \qquad (1)$$

However, the maximum difference in arm length $\Delta L$ which can be used is limited by the coherence of the Bragg reflections, which is required for the interference. Consequently, the quantity n·$\Delta L$ (n being the effective refractive index of the optical fibers of the Mach-Zehnder interferometer 56) should not be selected to be substantially larger than the coherence length $L_K$, since otherwise the contrast of the interference signal would be greatly decreased:

$$L_K = \lambda_B^2 / \Delta\lambda_B \qquad (2)$$

In the example, $L_K = 6.9$ mm and n=1.46, so that it is possible to select $\Delta L = 3$ mm. After the superimposition of the modulated light of the two interferometer arms 53 and 54 in the fiber coupler 52, the interference signal thus produced is relayed—simultaneously split into two optical paths—to the spectral analyzer 6.

In the spectral analyzer 6, which in this case is to be a spectrometer with an imaging holographic reflection grating 66 as dispersive element 63, the light from the two interferometer outputs is introduced via the two input light bundles 61 and 62 which are arranged adjacent to one another perpendicular to the normal reflection plane of the reflection grating 66 on both sides of this reflection plane. The light from the first input bundle 61 is spectrally dispersed at the reflection grating 64 and projected onto the first receiver arrangement 64, the latter being a CCD row 67 usually present in the spectrometer 6. The reflection grating 66 projects the light from the second input light bundle 62 onto the second receiver arrangement 65, which is arranged offset parallel to the first receiver arrangement 64 and in accordance with the mutual spacing of the input light bundles 61 and 62.

The CCD evaluation module 71 contained in the evaluation unit 7 determines in the spectrum the position of the maxima of the Bragg reflections, differing from one another by a few nanometers (for example 6 nm) in their wavelength regions, of the fiber gratings 41, 42 and 43. Although, as a rule, the CCD row 67 has a pixel center-to-center spacing of approximately 11 to 14 pm, it is possible on the basis of the wavelength dispersion of the spectrometer of 90 pm/pixel and through a suitable fitting to achieve a maximum determination with errors of about 1 pm. Consequently, it is possible to measure relatively stationary strains of up to approximately $1\mu\epsilon$. This measurement is not impaired by the interferences of the Mach-Zehnder interferometer 56, since the phase modulation by the phase modulators 55 leads to a sufficiently constant mean intensity on the CCD row 67 which is expediently set to an integration time of more than 1 ms.

There are various useful possibilities of implementation for the second receiver arrangement 65, which are to be explained below.

FIG. 2 shows in this regard a simple, advantageous variant in which optical fibers 69 are used to transmit the light on the second receiver position actually required to the photodiode array 68. In this arrangement, the number of the elements of the photodiode array 68 corresponds to the number of the fiber gratings 4 of the optical fiber 3 which are used. Consequently, in this case because of the use of three fiber gratings 41, 42 and 43 there is a need as effective receiver surfaces for three fiber ends of optical fibers 69 which are adapted, in accordance with the imaged reflections of the fiber gratings 41, 42 and 43, in size and position to the location and the fluctuation width of the fiber grating reflections. In the case of this type of the configuration of the second receiver arrangement 65, it is possible for the fiber diameter and fiber position to be adjusted suitably in a simple way, and for the optoelectronic receiver, the photodiode array 68, to be accommodated at an arbitrary point. In the case of the mean spacing of the Bragg wavelengths selected above, of the fiber gratings 41 to 43 of 6 nm negative relative to one another, the metric linear spacing of the Bragg reflexes in the receiver plane is 0.93 mm. For the purpose of optimum transmission of the Bragg reflections onto the photodiode array 68, the optical fibers 69 must have a core diameter of 0.6 mm and be positioned at a spacing of 0.93 mm such that each of these thick fibers respectively picks up precisely one reflex of the fiber gratings 41, 42 and 43.

After the optoelectronic conversion of the signals in the photodiode array 68, the interference signals of the individual elements of the photodiode array 68 are subjected to phase demodulation in separate phase demodulation modules 72 of the evaluation unit 7. In this case, as many phase demodulation modules 72 are contained in the evaluation unit 7 as there are reflections from different fiber gratings 4 of the optical fiber 3 which are to be evaluated, that is to say three in this example. For the purpose of evaluation, it is possible to make use of known demodulation methods such as have been specified, for example, by KERSEY et al. (in: "High-resolution fiber-grating based strain sensor with interferometric wavelength-shift detection", Electronic Letters 28 (1992) 3, pages 236–238) in order to detect strain-induced changes in wavelength in fibers. In order to achieve a high resolution, independent of intensity, of the optical phase as far as into the µrad region, use is made of a periodic phase modulation at a frequency of 40 kHz, controlled by the sine-wave modulation of a modulation generator 8, in the interferometer 6 and all the phase demodulation modules 72 are usually likewise fed this frequency of the modulation generator 8 as reference.

In the case of a relative change in the Bragg wavelength $\delta\lambda_B/\lambda_B = 3\cdot10^{-11}$ accompanied by the application of the preconditions to the equations (1) and (2), this yields an optical phase shift of $\Delta\phi=1$ µrad. It is therefore possible in practice to measure strain fluctuations with amplitudes of above 1 nm the frequency band from 100 Hz to 5 kHz.

A top view of the first and second receiver arrangements 63 and 64 is represented in FIG. 3 from the direction of the incidence of light from the dispersive element 63, in order to explain the geometrical relationships of the spacing and size of the light-sensitive elements. The explanations are intended to be independent of whether a linear photodiode array 68 is coupled directly or via optical fibers 69 and it is therefore possible to consider the second receiver arrangement 65 both as a specifically adapted photodiode array 68 and as light-receiving ends of optical fibers 69 which are located in the receiver plane. A photodiode array 68 is to be accepted directly in this example without limitation of generality.

Furthermore, to illustrate the position of the input light bundles 61 and 62 in principle relative to the two receiver arrangements 64 and 65, which cannot be derived with sufficient clarity in all the other figures, because of their diagrammatic representation, the input light bundles 61 and 62 are represented as circles as they would be visible as fiber ends in the case of a use of optical fibers when the reflection grating 66 is the location of the viewer. With reference to the normal reflection plane of the reflection grating 66, as indicated in FIG. 3 by a dashed and dotted line, the first and the second input light bundles 61 and 62 are situated inversely with respect to the location of the first and the second linear receiver arrangements 64 and 65.

Below the two receiver arrangements 64 and 65, the incoming narrow light bundles of the discrete Bragg reflections 46 of the fiber gratings 4 (here: for five different fiber gratings 4) are additionally represented diagrammatically, and their fluctuation widths 47 of the reflections 46 expected as a consequence of the external influences at the measuring points are specified. The effective receiver surfaces of the photodiode arrays 68 are adapted to these two quantities. The adaptation is performed by selecting the respective receiver surface of the photodiode array 68 in accordance with the magnitude of the reflection 46 and the fluctuation width 47 thereof, as well as by suitably positioning the receiver surfaces relative to one another as a function of the wavelength difference of the fiber gratings 4. The mean difference, selected in the description relating to FIG. 2, between the Bragg wavelengths of the fiber gratings 41 to 43 is also to be assumed here to be 6 nm for further fiber gratings 44 and 45 (not represented), so that the metric linear spacing of the Bragg reflections in the receiver plane can be taken as uniform at 0.93 mm, and use is made of a linear photodiode array 68 which is selected with these spacing conditions or is a specifically fabricated linear one.

A further variant of the arrangement according to the invention may be gathered from FIG. 4. In this example, only two optical fiber gratings 41 and 42 are illuminated with the aid of the superluminescent light emitting diode 1. However, the essential difference by comparison with FIG. 2 is that in this embodiment the interferometer arrangement 5 is integrated in the spectrometer 6 and is designed as a free-beam arrangement. In this case, the optical fiber coming from the fiber coupler 2 is advantageously introduced into a Mach-Zehnder interferometer 56 in which the light arriving from the optical fiber via a collimation optical system is split into two interferometer arms 53 and 54 of different optical path length by means of optical splitter mirrors 58 and deflection mirrors 59, guided, and brought into superimposition. In this case, the collimated light bundle is split by a splitter mirror 58 into a first interferometer arm 53 (dashed) and a second interferometer arm 54 (dotted). While the first interferometer arm 53 passes the splitter mirror 58 rectilinearly and is split once again at the other splitter mirror 58, the second interferometer arm 54 covers a longer optical path via two deflection mirrors 59, which are rigidly coupled mechanically, before it strikes the second splitter mirror 58 at an angle differing by 90° from the first interferometer arm 53. In accordance with this example, the rigidly coupled deflection mirrors 59 constitute a retroreflector (parallel retroreflection of the incoming light bundle) and are mounted on a mechanical displacing unit which periodically varies the light path in the second interferometer arm 54. This mechanical displacement, which is represented in a stylized fashion in FIG. 3 by means of a double arrow, incorporates the phase modulator 55 in this Mach-Zehnder interferometer 56 of free-beam optical design, said phase modulator preferably being of piezoelectric design. As described above for electro-optical phase modulators 55, this mechanical phase modulator 55 is driven in the same way by a modulation frequency generator 8.

The second interferometer arm 54 is likewise split at the second splitter mirror 58, and the two divided beams of the first interferometer arm 53 are superimposed on it. The superimposed beams are subsequently aligned parallel to one another by means of a further deflection mirror 59 arranged in one of the beam paths, and are focused via lenses. The two outputs of the Mach-Zehnder interferometer 56 which are thereby produced then represent the real input light bundles 61 and 62 of the spectrometer 6, the light of said bundles falling, as in the previous examples, onto the imaging dispersive element 63.

All further processes are as already described above, it being the case that in this example, as well, a photodiode array 68 with upstream optical fiber 69 is again used as second receiver arrangement 65. In this case, because of the only two existing fiber gratings 41 and 42 the photodiode array 68 requires only two active elements, and subsequently there is likewise a need for only two phase demodulation modules 72 for evaluation purposes.

Figure 5:
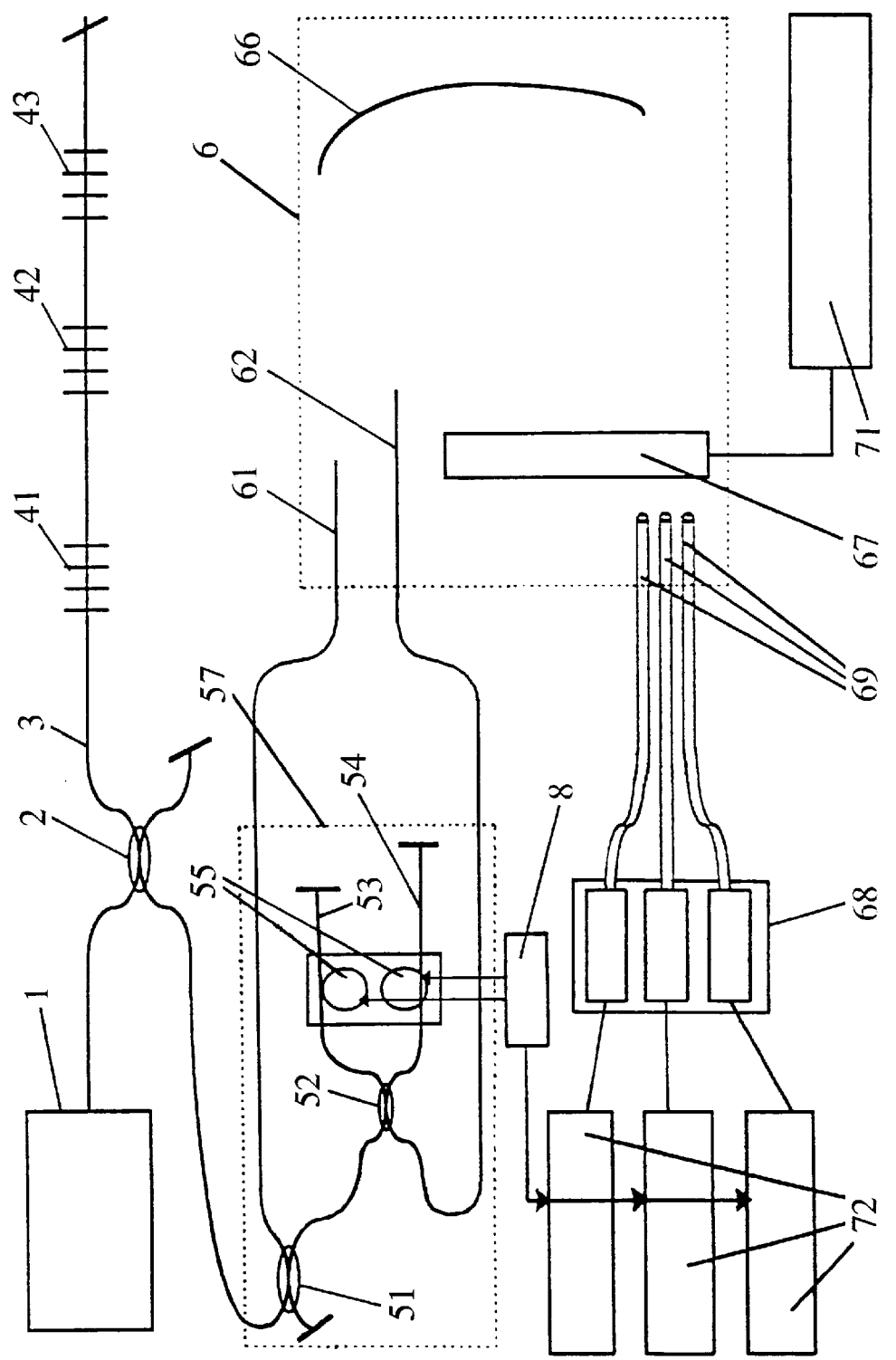
FIG. 5 shows a further advantageous configuration of the arrangement according to the invention, with an upstream Michelson interferometer and fiber-optic second receiver.

FIG. 5 is based on the same fundamental setup as FIG. 1 and virtually coincides with the structure of FIG. 2. The important difference consists in the configuration of the interferometer arrangement 5 which operates in this case in accordance with the principle of a Michelson interferometer. The Michelson interferometer 57 is advantageously constructed using optical fibers and contains two fiber couplers 51 and 52. The fiber coupler 51 branches the optical fiber coming from the fiber coupler 2 and leading the Bragg reflections from the fiber gratings 41, 42 and 43 directly downstream of the interferometer input, and leads an optical fiber through directly onto the first interferometer output. The other optical fiber of the fiber coupler 51 is fed immediately to the second fiber coupler 52 in order to undertake splitting into two interferometer arms 53 and 54, and to arrange in the latter one phase modulator 55 each through which light passes twice in each case as a consequence of end silvering of the fiber ends of the interferometer arms 53 and 54. After return of the modulated, reflected signals, the two interferometer arms 53 and 54 are superimposed in the fiber coupler 52 and coupled out onto the second interferometer output of the Michelson interferometer 57. As in the previous examples, the two outputs form the two input light bundles 61 and 62 of the spectral analyzer 6 which operates in the way already described above. The particular feature in the case of this configuration is that the first input light bundle 61 of the spectrometer 6 passes unmodulated to the spectral dispersion at the imaging reflection grating 66, as a result of which restrictions relating to the readout regime of the CCD row 67 (as first receiver arrangement 64) are superfluous. The modulated interferometer light thus reaches only the second receiver arrangement 65, which is assembled here, again, from optical fibers and a downstream photodiode array 68. Driving the phase modulators 55 via the modulation frequency generator 8 and evaluating the interference signals are performed in ways similar to those in the other exemplary embodiments.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for optically determining an absolute physical state variable in an optical fiber with the aid of an optical spectral analyzer for determining different Bragg wavelengths of fiber gratings which have different mean wavelengths and at which the light traversing the optical fiber is reflected, as well as means for calculating the absolute physical quantity from the determined Bragg wavelengths, comprising:

an optical spectral analyzer in the form of a spectrometer having an imaging, spectrally dispersive element;

a first linear receiver arrangement;

a first input light bundle being arranged with reference to said dispersive element such that the light spectrally dispersed at said dispersive element is projected onto said first linear receiver arrangement;

a second linear receiver arrangement;

an additional second input light bundle being directed onto said dispersive element in said spectrometer, whose spectrally dispersed light falls onto said second linear receiver arrangement, parallel to the first one;

a broadband light source;

said two input light bundles being fed light from said broadband light source which has been reflected by at least two optical fiber gratings with different mean wavelengths;

an interferometer arrangement with phase modulation and different arm lengths being present at least in the light path of the second input light bundle upstream of the spectral dispersion by said dispersive element;

said interferometer arrangement having an evaluation section which is arranged downstream of said second receiver arrangement assigned to said input light bundle;

a signal processing module for determining the absolute Bragg wavelengths of the optical fiber gratings and for calculating a physical variable dependent thereon being connected downstream of said first receiver arrangement; and phase demodulation modules arranged downstream of said second receiver arrangement being provided for evaluating interferometer signals for determining relative changes in the Bragg wavelengths of the optical fiber gratings, and for calculating the relative changes in a physical quantity.

2. The arrangement according to claim 1, wherein, for a selected measurement, task determination of the temperature is provided as the absolute physical quantity, and determination of strain fluctuations in the optical fiber is provided as the variable relative quantity.

3. The arrangement according to claim 1, wherein the optical fiber gratings are arranged inside the optical fiber which function as a measuring point.

4. The arrangement according to claim 1, wherein the imaging dispersive element is a prism.

5. The arrangement according to claim 1, wherein the imaging dispersive element is an imaging reflection grating.

6. The arrangement according to claim 1, wherein a Mach-Zehnder interferometer with two outputs is present as interferometer arrangement, the first and the second input light bundles of the spectrometer being formed in each case by one of the outputs of the Mach-Zehnder interferometer.

7. The arrangement according to claim 1, wherein the interferometer arrangement is a Michelson interferometer which is arranged in the light path of the second input light bundle downstream of a splitting of the light from the optical fiber onto the input light bundles of the interferometer.

8. The arrangement according to claim 1, wherein the interferometer arrangement is a Michelson interferometer whose conventional output is applied via a splitter to the second input light bundle of the spectrometer, and whose existing light path is branched outside the interferometer arms in order to be fed as first input light bundle to the spectrometer.

9. The arrangement according to claim 1, wherein the interferometer arrangement is a Michelson interferometer whose light path branches in a two-fold fashion at the input of the Michelson interferometer, a first splitter being present to create a direct light path to the first input light bundle of the spectrometer, and a second light path to a second splitter, which is provided for the purpose of splitting the second light path into two interferometer arms as well as, after reflection of the light in the interferometer arms, of combining an outcoupling onto a third light path to the second input light bundle of the spectrometer.

10. The arrangement according to claim 1, wherein the interferometer arrangement is a set-up using free-beam optics as mirror elements, a mechanical displacing unit being provided as phase modulator for periodically changing the optical path length of an interferometer arm by a mirror displacement.

11. The arrangement according to claim 10, wherein the free-beam optical system is constructed as a Mach-Zehnder interferometer and is integrated in the spectrometer, and the outputs of the Mach-Zehnder interferometer constitute the input light bundles.

12. The arrangement according to claim 1, wherein the interferometer arrangement is constructed from optical fibers and fiber couplers as optical splitters.

13. The arrangement according to claim 12, wherein the optical fibers are monomode fibers.

14. The arrangement according to claim 1, wherein the interferometer arrangement contains an optical phase modulator at least in one interferometer arm.

15. The arrangement according to claim 14, wherein an electro-optical modulator is used as phase modulator.

16. The arrangement according to claim 15, wherein the phase modulator can be driven by two-frequency sine-wave modulation and can be evaluated on a common multiple of the two modulation frequencies.

17. The arrangement according to claim 14, wherein one phase modulator each is arranged in the two interferometer arms, the phase modulators being piezoelectric fiber stretchers for implementing a symmetric basic set up of the interferometer arms, and one phase modulator is driven in push-pull fashion relative to the other phase modulator.

18. The arrangement according to claim 1, wherein the first receiver arrangement is a CCD row.

19. The arrangement according to claim 1, wherein the second receiver arrangement is adapted in number, position and width of the light entrance surfaces of its elements to the reflections of the different optical fiber gratings, account additionally being taken in this case of the expected fluctuation widths, dependent on the measured quantity, of the wavelengths of the fiber grating reflections.

20. The arrangement according to claim 19, wherein the second receiver arrangement is a photodiode array with a specifically produced distribution and size of the light-sensitive elements.

21. The arrangement according to claim 19, wherein the second receiver arrangement is a photodiode array with a regular distribution and size of the light-sensitive elements, only specific elements being used to evaluate the fiber grating reflections.

22. The arrangement according to claim 19, wherein optical fibers for launching the fiber grating reflections onto the second receiver arrangement are present for the purpose of adaptation to the conditions of the fiber grating reflections, optical fibers being adapted with their diameters and spacings to the number, position and magnitude of the fiber grating reflections, and the light entrance surfaces of the fibers being arranged in the receiver plane prescribed by the imaging reflection gratings, and their light exit surfaces being directed onto an arbitrarily positioned linear photodiode array.

23. The arrangement according to claim 22, wherein the second receiver row is a row with regularly arranged elements.

24. The arrangement according to claim 23, wherein the second receiver row is a regular photodiode row.

* * * * *